(12) United States Patent
Lee

(10) Patent No.: US 9,205,854 B1
(45) Date of Patent: Dec. 8, 2015

(54) PROTECTION DEVICES FOR SHOPPING CARTS

(71) Applicant: Man Lin Lee, Tuen Mun (HK)

(72) Inventor: Man Lin Lee, Tuen Mun (HK)

( * ) Notice: Subject to any disclaimer, the term of this patent is extended or adjusted under 35 U.S.C. 154(b) by 0 days.

(21) Appl. No.: 14/518,999

(22) Filed: Oct. 20, 2014

(51) Int. Cl.
| | |
|---|---|
| *B60R 21/13* | (2006.01) |
| *B62B 5/00* | (2006.01) |
| *B62B 3/14* | (2006.01) |
| *B60R 21/0132* | (2006.01) |
| *B60R 21/013* | (2006.01) |
| *B60R 21/00* | (2006.01) |

(52) U.S. Cl.
CPC ............ *B62B 5/0006* (2013.01); *B60R 21/0132* (2013.01); *B60R 21/13* (2013.01); *B62B 3/1444* (2013.01); *B60R 2021/0027* (2013.01); *B60R 2021/01306* (2013.01); *B60R 2021/138* (2013.01)

(58) Field of Classification Search
CPC .... B62B 5/0006; B62B 3/1444; B60R 21/13; B60R 21/0132; B60R 2021/0027; B60R 2021/01306; B60R 2021/138
See application file for complete search history.

(56) References Cited

U.S. PATENT DOCUMENTS

| | | | | |
|---|---|---|---|---|
| 5,052,065 | A | * | 10/1991 | West .................................. 5/424 |
| 6,386,576 | B1 | * | 5/2002 | Kamen et al. .............. 280/728.1 |
| 7,396,033 | B2 | * | 7/2008 | Murata et al. ................. 280/293 |
| 2013/0131930 | A1 | * | 5/2013 | Kwong .......................... 701/45 |

\* cited by examiner

*Primary Examiner* — Drew Brown
(74) *Attorney, Agent, or Firm* — Matthew M. DiMaggio, Esq.

(57) ABSTRACT

According to embodiments of the invention, systems, methods and devices are directed to a shopping cart with safety features which prevent or reduce the risk of injury caused to those using the cart as well as those in the vicinity of the shopping cart. A wheelbase of the shopping cart may have a set of wheels. Each wheel may have an airbag stored therein. The airbag may be deployable from any one of the wheels such the wheel is engulfed, fully or partially, within the inflated airbag. A pressure sensor may be attached to each of the wheels. The pressure sensor may constantly monitor the force being exerted in the wheel in order to identify moments when the traction may be comprised or when the cart may be at risk of toppling over. A speed or velocity sensor is attached to the wheelbase to monitor and detect for excessive speeds. The airbags may be inflatable by one or more compressed air or compressed gas cylinders or vessels.

10 Claims, 4 Drawing Sheets

PROTECTION DEVICES FOR SHOPPING CARTS

FIELD OF THE INVENTION

This invention generally relates to personal safety. Specifically, this invention relates providing a safety mechanism for use in preventing injuries and/or accidents involving shopping carts.

BACKGROUND OF THE INVENTION

Many studies have found that there is a growing number of accidents involving shopping carts. For example, children sitting in shopping carts may get hurt when they fall out of the carts. Also, when the shopping carts are going fast, some types of carts may be less unstable so that any vertical pressure on the handle will flip the cart over backward. The scenario is more likely to happen if there is a child seated in a seating position near the back of the cart because it raises the centre of gravity and may cause the cart to flip over backward much more easily. Even something as simple as another child pulling on the handle or a bag hanging from the handle may be dangerous enough to flip the cart. Because of the potential harm that may cause severe injuries to children, parents need to be increasingly vigilant when children are in or around a shopping cart.

Additionally, there are supermarkets looking for ways to improve safety of shopping carts so that consumers can be assured shop safely with children without the risk, no matter how slight the possibility, of having a child injured by shopping carts. Some may suggest putting warning labels on the carts while others promote utilizing safety belts as mandatory measures. Liability for shopping cart-related injuries has been pinned on the storeowners, thus storeowners may seek increased safety with respect to their shopping carts.

Therefore, it is an objective of the disclosed technology to provide a shopping cart that addresses the aforementioned safety concerns, and provide a less dangerous shopping experience for those with small children or babies.

SUMMARY OF THE INVENTION

According to embodiments of the invention, systems, methods and devices are directed to a shopping cart with safety features that prevent or reduce the risk of injury caused to those using the cart as well as those in the vicinity of the shopping cart. A wheelbase of the shopping cart may have a set of wheels. Each wheel may have an airbag stored therein. The airbag may be deployable from any one of the wheels such the wheel is engulfed, fully or partially, within the inflated airbag. A pressure sensor may be attached to each of the wheels. The pressure sensor may constantly monitor the force being exerted in the wheel in order to identify moments when the traction may be comprised or when the cart may be at risk of toppling over. A speed or velocity sensor is attached to the wheelbase to monitor and detect for excessive speeds. The airbags may be inflatable by one or more compressed air or compressed gas cylinders or vessels.

In an embodiment of the disclosed invention, a shopping cart is equipped with safety features to prevent injuries. The features may reduce the speed of the cart, reduce the shock of impact of the cart with the ground or another object, or maintain control during a loss of balance or speed of the cart. A "shopping cart", "shopping trolley, "cart", and/or "trolley" for purposes of this specification, is defined as any device or apparatus used to temporarily transport goods using a storing portion and a wheel or other friction reducing mechanism.

The shopping cart may have one or more of the following components: a) a seat attached to the shopping cart for a child; b) a wheelbase having a set of wheels, each wheel having an airbag stored therein such that activation of the airbags causes the corresponding wheels to be embedded inside the airbags; c) a pressure sensor attached to each of the wheels for monitoring the pressure of the wheels on the ground to detect any possibility of the shopping cart falling over; d) a speed sensor attached to the wheelbase for monitoring the velocity of the shopping cart to detect excessive speeds; and e) a vessel of compressed gas, wherein the gas is injectable into one or more of the airbags.

In a further embodiment, the speed sensor detects when the shopping cart is starting to accelerate to an excessive speed and injects the gas into all the airbags causing the airbags to be expanded. Still further, the pressure sensor may detect lighter pressure on a wheel, thereby indicating a rollover risk, and injects the denser gas into the airbag associated with the wheel causing the associated airbag to be expanded to maintain balance.

A "rollover" of the shopping cart occurs when the shopping cart falls frontwards, backwards or to the sides, during which one or more wheels lose contact with the ground. An ensuing rollover may be detectable using the combined readings of the pressure sensors associated with the wheels. For example, if the pressure or force exerted on one or two wheels becomes suddenly increased, while the pressure or force on the opposing one or two wheels suddenly decreases, then the shopping cart may be currently rolling over or about to roll over. If the shopping cart starts to roll over as detected by the pressure sensors, then the following steps may be taken, not necessarily in the following order: a) the seat is detached and ejected from the shopping cart; b) the airbag is filled with a lighter-than-air gas or substance; c) the seat becomes suspended in the air due to the lighter gas; and d) a parent is notified of a location of the seat using a location detector. In an alternative embodiment, the airbag may be inflated with a denser-than-air material or gas, in order to weigh down that portion of the cart.

In another embodiment of the disclosed technology, a method is used for preventing injuries and accidents with respect to a shopping cart. In this embodiment, the shopping cart has a plurality of wheels, each wheel having a corresponding un-inflated airbag. The method may be carried out, not necessarily in the following order, by: a) continuously monitoring readings taken from pressure sensors and a velocity sensor disposed on the shopping cart, wherein the pressure sensors measures a pressure of each of the plurality of wheels with respect to the ground, and further wherein the velocity sensor measures a velocity of the shopping cart; b) detecting when a threshold pressure change or a threshold velocity is reached; and c) triggering activation of one or more of the plurality of airbags to minimize injury and damage.

Further, the triggering of airbags may correspond to feedback detected from the pressure sensors such that the airbags are inflated with respect to the wheels that are experiencing the highest pressure levels. Still further, if the pressure sensors detect a pressure high enough to pose a rollover risk to the shopping cart, a seat disposed on the shopping card is ejected from the cart and seat airbags associated with the seat are inflated. The volume of the seat airbags may be sufficient to cause the seat to become suspended when the seat airbags are filled with a lighter-than-air gas.

In still another embodiment of the disclosed technology, a shopping cart has features for preventing injuries caused to others nearby. The shopping cart may have one or more of the following components: a) a seat attached to the shopping cart allowing a child to sit upon; b) a wheelbase containing a set of wheels, each wheel having an airbag stored inside the wheel, so that when the airbag is activated anyone of the set of wheels can be embedded inside the airbags; c) a pressure sensor attached to each of the wheels, wherein by monitoring pressure of each of the wheels off the ground the pressure sensor can detect any tendency causing a flip over of the shopping cart; d) a speed sensor attached to the wheelbase, wherein the speed sensor detects any speed limit violations; e) a bottle of gas denser than air, wherein the denser air can be injected into the respective airbag stored inside the wheel selectively, so that when needed one of the wheels can be embedded inside an airbag whereas the rest of wheels are airbags unaffected or free.

If the speed sensor detects that the shopping cart is starting to accelerate to a point that seems over the limit, then the cart may be slowed down by injecting the denser gas into all the airbags causing the airbag to be expanded, slowing down the shopping cart. Upon detecting that a flip over or rollover of the shopping cart is starting to occur as indicated by the pressure sensor detecting lighter pressure on a wheel, the denser gas may be injected into the airbag associated with the wheel causing the associated airbag to be expanded, while giving weight to the side that is about to be off the ground and providing sufficient balance to the shopping cart. Finally, the current location of the child may be detected using a GPS receiver and sending the current location of the child to a parent or user of the shopping cart using an antenna or wireless network card.

In accordance with these and other objects which will become apparent hereinafter, the invention will now be described with particular reference to the drawings.

DETAILED DESCRIPTION

According to embodiments of the invention, systems, methods and devices are directed to a shopping cart with safety features that prevent or reduce the risk of injury caused to those using the cart as well as those in the vicinity of the shopping cart. A wheelbase of the shopping cart may have a set of wheels. Each wheel may have an airbag stored therein. The airbag may be deployable from any one of the wheels such the wheel is engulfed, fully or partially, within the inflated airbag. A pressure sensor may be attached to each of the wheels. The pressure sensor may constantly monitor the force being exerted in the wheel in order to identify moments when the traction may be comprised or when the cart may be at risk of toppling over. A speed or velocity sensor is attached to the wheelbase to monitor and detect for excessive speeds. The airbags may be inflatable by one or more compressed air or compressed gas cylinders or vessels.

In further embodiments, the shopping cart may have a seat, and may detect when a child is sitting in a seat portion of the shopping cart. Upon detecting an ensuing accident or rollover, the shopping cart may eject the seat and deploy additional airbags which are stored in or on the seat. The airbags may be used to soften any landing or collision with the ground or another object. Further, the seat-based airbags may be inflated with lighter-than-air gas from a compressed gas vessel. The inflated airbag may float in mid-air or reduce the velocity of the seat as it approaches the ground or another object.

Figure 1:
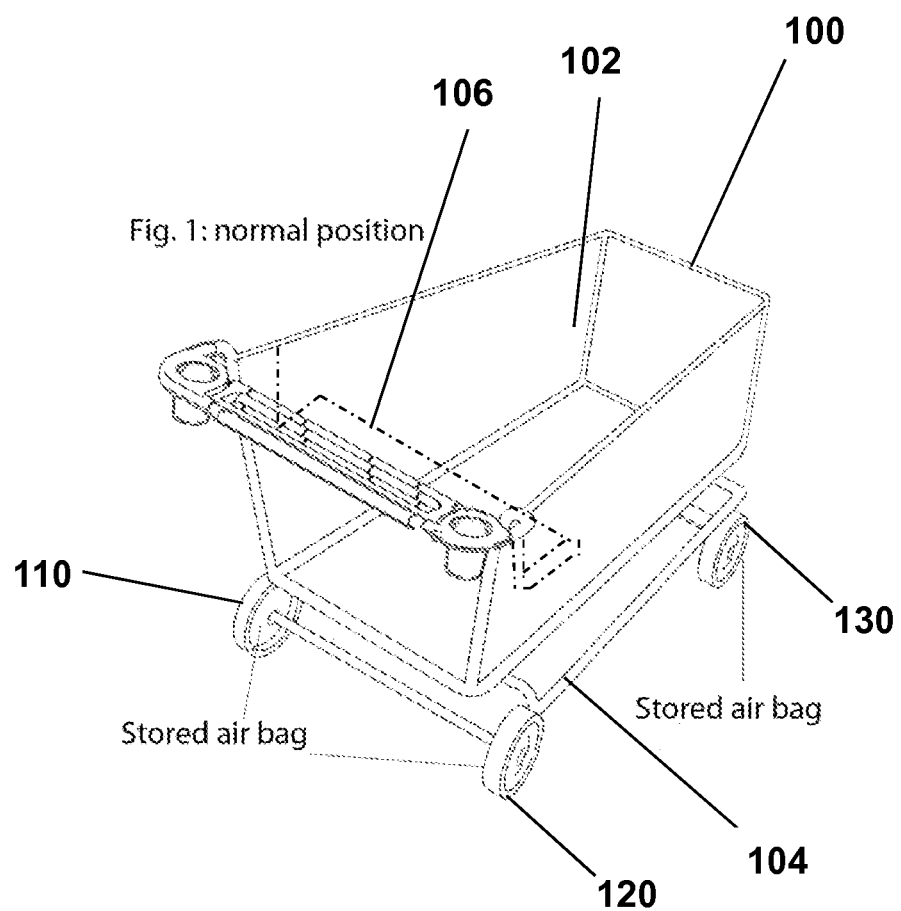
FIG. 1 shows a shopping cart in a normal, resting position according to an embodiment of the disclosed technology.

Referring now to the figures, FIG. 1 shows a shopping cart in a normal, resting position according to an embodiment of the disclosed technology. The shopping cart 100 (hereinafter referred to as 'shopping cart 100' or 'cart 100', these terms may be used interchangeably) is generally composed of a top basket portion 102 and a wheelbase 104. A "shopping cart", "shopping trolley, "cart", and/or "trolley" for purposes of this specification, is defined as any device or apparatus used to temporarily transport goods using a storing portion and a wheel or other friction reducing mechanism. The wheelbase 104 has a plurality of wheels affixed thereto. In the example shown in FIG. 1, the wheelbase 104 has four wheels, 110, 120, 130 and 140 (not shown). The cart 100 may also have a seat 106 for a child or infant. According to disclosed technology, the seat 106 may be detachable or ejectable from the shopping cart 100. The seat 106 may have its own uninflated airbags disposed on or in the seat. The seat 106 may also have a safety strap or belt for securing a child to the seat 106 to prevent the child from falling out of the seat.

Although not visible in the shown position of the cart 100, each wheel has a deflated airbag stored therein. Additionally, one or more sensors may be disposed on each of the wheels and/or other portions of the cart. A pressure sensor may be disposed on each wheel to measure the pressure of the wheel with respect to the ground. During normal operating conditions, the pressure on each of the wheel should remain fairly constant and should be the same for each of the back wheels 110 & 120, as well as each of the front wheels 130 & 140, depending on weight distribution of objects within the basket portion 102 of the cart 100.

Figure 2:
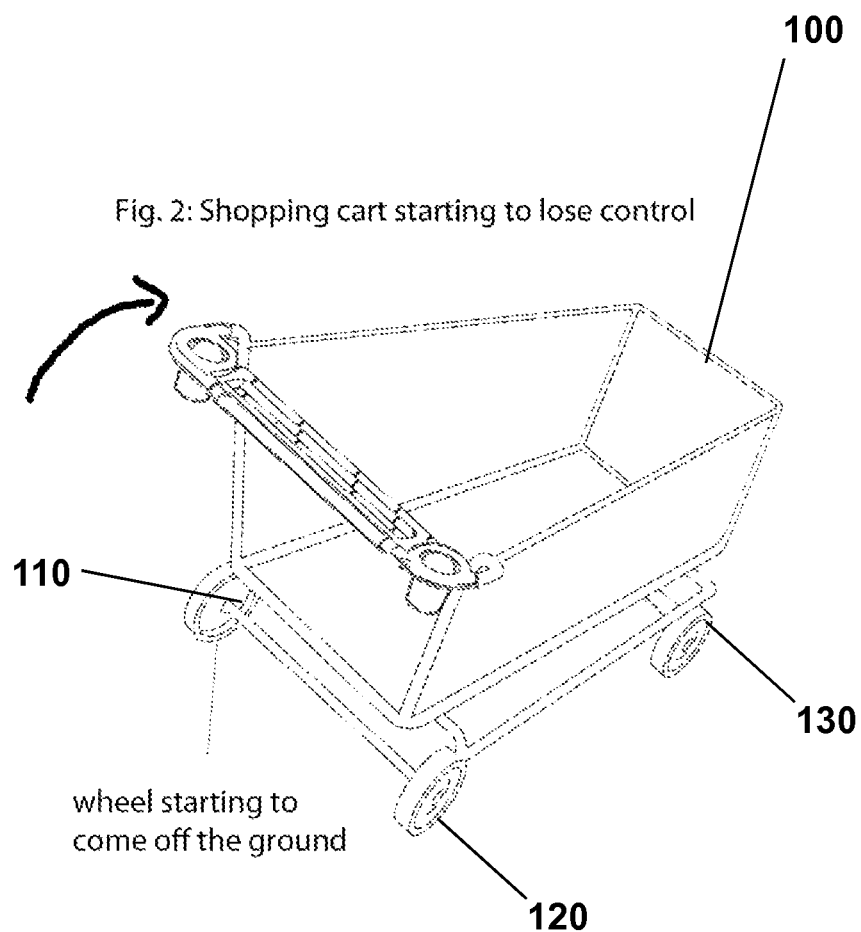
FIG. 2 shows a shopping cart beginning to lose control according to an embodiment of the disclosed technology.

FIG. 2 shows a shopping cart beginning to lose control according to an embodiment of the disclosed technology. In this position, the pressure on the right side wheels 120 & 130, will be much higher than the pressure on the left side wheels 110 & 140, which may even be reduced to zero. In the position depicted, the back left wheel 110 is shown starting to come off the ground. At this point, the sensors would detect a pressure imbalance and therefore an increase in rollover risk. As such, the cart 100 may take remedial measures to prevent or reduce the severity of the rollover. Such measure may include automatic shifting of weight by inflating the left wheels with a denser-than-air material or gas. Alternatively, the right side airbags may be deployed to cause the right wheels to slow down or stop, or to reduce the shock of impact on the right side if the cart 100 flips over.

Figure 3:
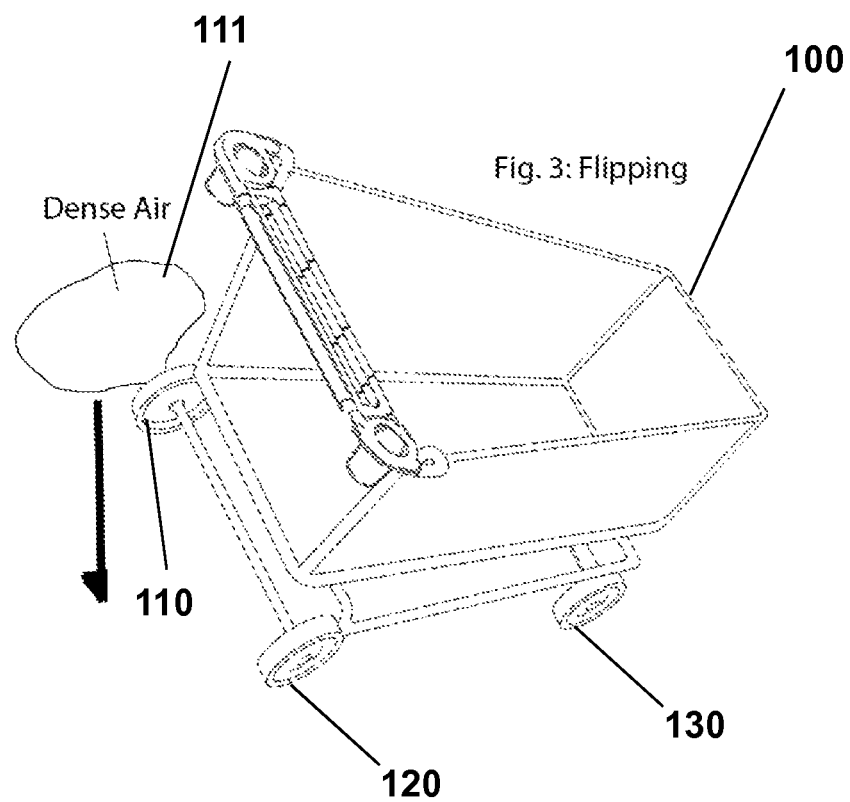
FIG. 3 shows a shopping cart rolling over and an airbag deployed according to an embodiment of the disclosed technology.

FIG. 3 shows a shopping cart rolling over and an airbag deployed according to an embodiment of the disclosed technology. In the depicted position, the airbag 111 associated with the back left wheel 110 is deployed and inflated. In this example, the airbag 111 is filled with dense air, gas, or material in order to add weight to the left side of the cart 100 to counter the ensuing rollover and maintain a balance.

The cart 100 may also have numerous other electronic and/or computing components on a portion thereof. A set of integrated circuits associated with the cart 100 may be programmable to make decisions based on artificial intelligence and feedback related to the sensors and/or the wheels. "Artificial intelligence", for purposes of this specification, is defined as the ability of computer systems to perform tasks that normally require human intelligence, such as visual perception, speech recognition, decision-making, and translation between languages.

A location component, such as a Global Positioning System ("GPS") receiver may also be included in the cart 100 and/or the seat. Further, a SIM card may be installed in the cart 100 and/or the seat. The SIM card may send information to a user of the cart 100 instantly. The information may include the location of the seat and/or the cart 100 in the event of an accident. The cart 100 may also have an antenna or wireless network card for communicating via a wireless network such as a packet-switched data network, Wi-Fi network, or a near-field communication network.

The cart 100 may also have an associated processor and memory. The memory stores instructions that cause the processor to execute one or more methods. The method may be carried out, not necessarily in the following order, by: a) continuously monitoring readings taken from pressure sensors and a velocity sensor disposed on the shopping cart, wherein the pressure sensors measures a pressure of each of the plurality of wheels with respect to the ground, and further wherein the velocity sensor measures a velocity of the shopping cart; b) detecting when a threshold pressure change or a threshold velocity is reached; and c) triggering activation of one or more of the plurality of airbags to minimize injury and damage.

In a further embodiment, the speed sensor detects when the shopping cart is starting to accelerate to an excessive speed and injects the gas into all the airbags causing the airbags to be expanded. Still further, the pressure sensor may detect lighter pressure on a wheel, thereby indicating a rollover risk, and injects the denser gas into the airbag associated with the wheel causing the associated airbag to be expanded to maintain balance.

A "rollover" of the shopping cart occurs when the shopping cart falls frontwards, backwards or to the sides, during which one or more wheels lose contact with the ground. An ensuing rollover may be detectable using the combined readings of the pressure sensors associated with the wheels. For example, if the pressure or force exerted on one or two wheels becomes suddenly increased, while the pressure or force on the opposing one or two wheels suddenly decreases, then the shopping cart may be currently rolling over or about to roll over. If the shopping cart starts to roll over as detected by the pressure sensors, then the following steps may be taken, not necessarily in the following order: a) the seat is detached and ejected from the shopping cart; b) the airbag is filled with a lighter-than-air gas or substance; c) the seat becomes suspended in the air due to the lighter gas; and d) a parent is notified of a location of the seat using a location detector. In an alternative embodiment, the airbag may be inflated with a denser-than-air material or gas, in order to weigh down that portion of the cart.

Figure 4:
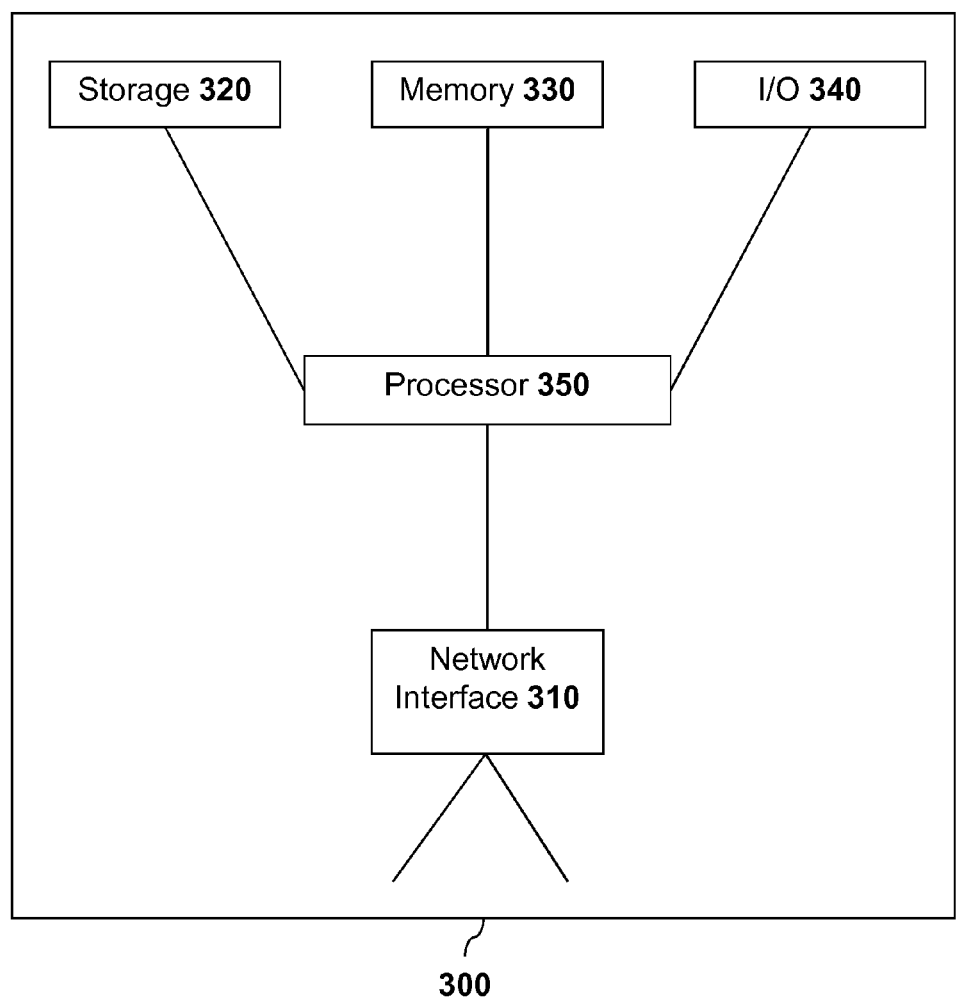
FIG. 4 is a high-level block diagram of a microprocessor device that may be used to carry out the disclosed technology.

FIG. 4 is a high-level block diagram of a microprocessor device that may be used to carry out the disclosed technology. The device 300 may or may not be a computing device. The device 300 comprises a microchip (also referred to as "a smart chip") and/or processor 350 that controls the overall operation of a computer by executing the reader's program instructions which define such operation. The device's program instructions may be stored in a storage device 320 (e.g., magnetic disk, database) and loaded into memory 330 when execution of the console's program instructions is desired. Thus, the device's operation will be defined by its program instructions stored in memory 330 and/or storage 320, and the console will be controlled by the processor 350 executing the console's program instructions.

The device 300 may also include one or a plurality of input network interfaces for communicating with other devices via a network (e.g., the internet). The device 300 further includes an electrical input interface for receiving power and data from a power or wireless data source. The device 300 may also include one or more output network interfaces 310 for communicating with other devices. The device 300 may also include input/output 340 representing devices which allow for user interaction with a computer (e.g., display, keyboard, mouse, speakers, buttons, etc.).

One skilled in the art will recognize that an implementation of an actual device will contain other components as well, and that FIG. 4 is a high level representation of some of the components of such a device for illustrative purposes. It should also be understood by one skilled in the art that the devices depicted and described with respect to FIGS. 1 through 3 may be implemented on a device such as is shown in FIG. 4. Thus, the device 300 of FIG. 4 may describe the inner workings of the cart 100 and/or any of its sensors or components.

While the disclosed invention has been taught with specific reference to the above embodiments, a person having ordinary skill in the art will recognize that changes can be made in form and detail without departing from the spirit and the scope of the invention. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

The invention claimed is:

1. A shopping cart having features to prevent injuries, comprising:
    a seat attached to the shopping cart for a child;
    a wheelbase having a set of wheels, each wheel having an airbag stored therein such that activation of the airbags causes the corresponding wheels to be embedded inside the airbags;
    a pressure sensor attached to each of the wheels for monitoring the pressure of the wheels on the ground to detect any possibility of the shopping cart falling over;
    a speed sensor attached to the wheelbase for monitoring the velocity of the shopping cart to detect excessive speeds; and
    a vessel of compressed gas, wherein the gas is injectable into one or more of the airbags.

2. The shopping cart of claim 1, wherein the speed sensor detects when the shopping cart is starting to accelerate to an excessive speed and injects the gas into all the airbags causing the airbags to be expanded.

3. The shopping cart of claim 1, wherein the pressure sensor detects lighter pressure on a wheel, thereby indicating a rollover risk, and injects the denser gas into the airbag associated with the wheel causing the associated airbag to be expanded to maintain balance.

4. The shopping cart of claim 2, wherein the pressure sensor detects lighter pressure on a wheel, thereby indicating a rollover risk, and injects the denser gas into the airbag associated with the wheel causing the associated airbag to be expanded to maintain balance.

5. The shopping car of claim 1, wherein if the shopping cart starts to roll over as detected by the pressure sensor:
    the seat is detached and ejected from the shopping cart;
    the airbag is filled with a lighter gas;

the seat becomes suspended in the air due to the lighter gas; and a parent is notified of a location of the seat using a location detector.

6. A method of preventing injuries and accidents with respect to a shopping cart, the shopping cart having a plurality of wheels, each wheel having a corresponding uninflated airbag, the method comprising the following steps:

continuously monitoring readings taken from pressure sensors and a velocity sensor disposed on the shopping cart, wherein the pressure sensors measures a pressure of each of the plurality of wheels with respect to the ground, and further wherein the velocity sensor measures a velocity of the shopping cart;

detecting when a threshold pressure change or a threshold velocity is reached; and triggering activation of one or more of the plurality of airbags to minimize injury and damage.

7. The method of claim 6, wherein the triggering of airbags corresponds to feedback detected from the pressure sensors such that the airbags are inflated with respect to the wheels which are experiencing the highest pressure levels.

8. The method of claim 6, wherein if the pressure sensors detect a pressure high enough to pose a rollover risk to the shopping cart, a seat disposed on the shopping cart is ejected from the cart and seat airbags associated with the seat are inflated.

9. The method of claim 8, wherein the volume of the seat airbags is sufficient to cause the seat to become suspended when the seat airbags are filled with a lighter-than-air gas.

10. A shopping cart with features preventing injuries caused to others nearby, comprising:

a seat attached to the shopping cart allowing a child to sit upon;

a wheelbase containing a set of wheels, each wheel has an airbag stored inside the wheel, so that when the airbag is activated anyone of the set of wheels can be embedded inside the airbags;

a pressure sensor attached to each of the wheels, wherein by monitoring pressure of each of the wheels off the ground the pressure sensor can detect any tendency causing a flip over of the shopping cart;

a speed sensor attached to the wheelbase, wherein the speed sensor detects any speed limit violations;

a bottle of gas denser than air, wherein the denser air can be injected into the respective airbag stored inside the wheel selectively, so that when needed one of the wheels can be embedded inside an airbag whereas rest of wheels are airbags free, wherein:

the speed sensor detects that the shopping cart is starting to accelerate to a point that seems over the limit, i) slow down the shopping cart by injecting the denser gas into all the airbags causing the airbag to be expanded, slowing down the shopping cart;

detecting that a flip over of the shopping cart is starting to occur as indicated by the pressure sensor detecting lighter pressure on a wheel, injecting the denser gas into the airbag associated with the wheel causing the associated airbag to be expanded, while giving weight to the side that is about to be off the ground and providing sufficient balance to the shopping cart;

detecting current location of the infant, by using the GPS receiver; and sending the current location of the child to a parent, by using an antenna.

* * * * *